June 24, 1924.
A. B. SEPPMANN
1,498,933
DEVICE FOR DISASSEMBLING UNIVERSAL JOINTS
Filed April 28, 1923
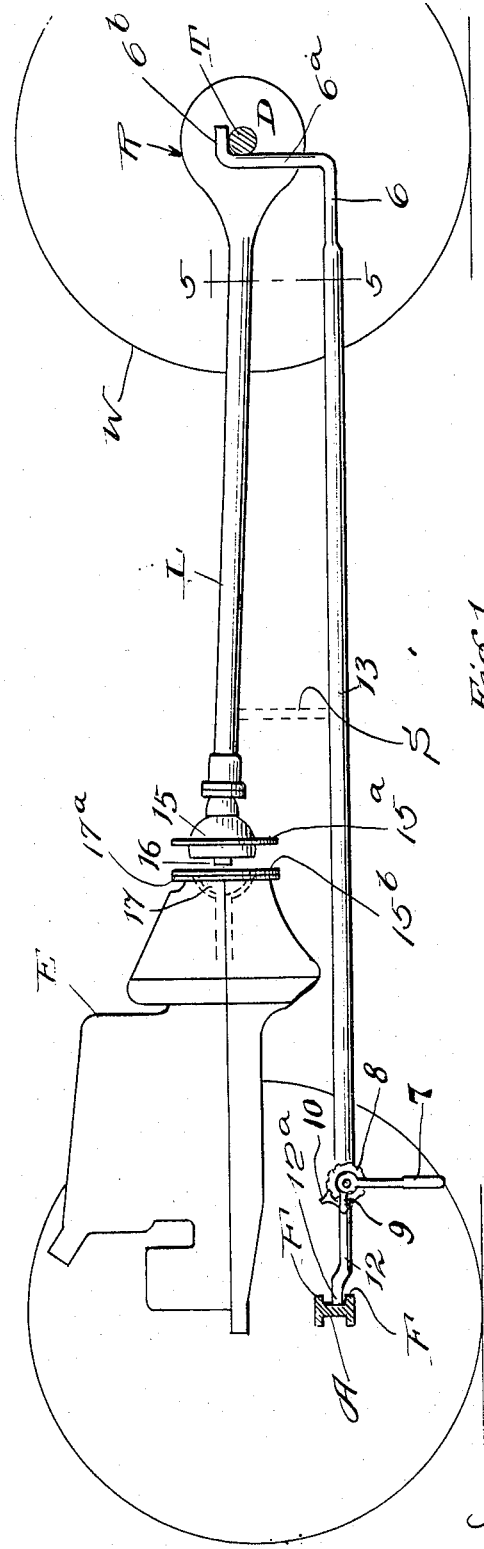
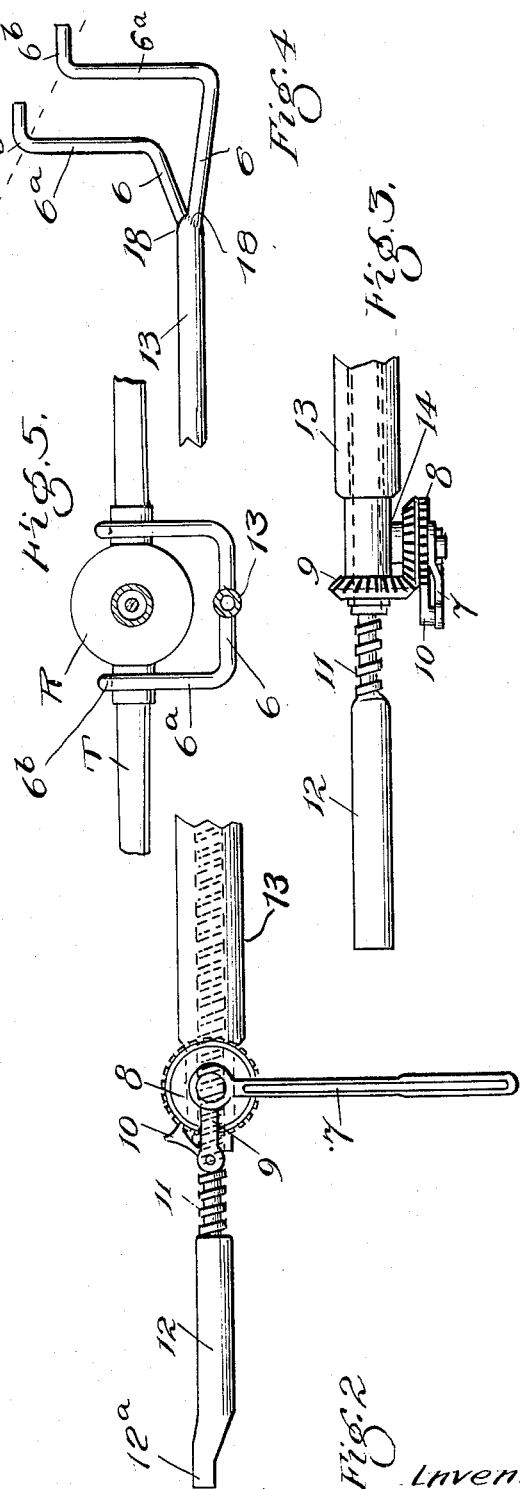
Inventor
Alfred B. Seppmann
By Watson E. Coleman, Atty.

Patented June 24, 1924.

1,498,933

UNITED STATES PATENT OFFICE.

ALFRED B. SEPPMANN, OF LAKE CRYSTAL, MINNESOTA.

DEVICE FOR DISASSEMBLING UNIVERSAL JOINTS.

Application filed April 28, 1923. Serial No. 635,302.

*To all whom it may concern:*

Be it known that I, ALFRED B. SEPPMANN, a citizen of the United States, residing at Lake Crystal, in the county of Blue Earth and State of Minnesota, have invented certain new and useful Improvements in Devices for Disassembling Universal Joints, of which the following is a specification, reference being had to the accompanying drawings.

This invention relates to a device for disassembling the universal joint of a motor vehicle.

An important object of the invention is to provide a device of this character so constructed that the universal joint can be disassembled without the necessity of removing the rear construction of the vehicle.

A further object of the invention is to provide a device of this character so constructed that during the operation of separating the portions of the universal joint the shaft tube and universal joint are maintained in proper alignment.

A still further object of the invention is to provide a device of this character which may be very readily applied to the vehicle, which is simple in its construction and operation and which will be durable and efficient in service.

These and other objects I attain by the construction shown in the accompanying drawings, wherein for the purpose of illustration is shown a preferred embodiment of my invention and wherein:—

Figure 1 is a side elevation which is partially diagrammatic, showing a vehicle the rear construction of which has been shifted rearwardly by a tool constructed in accordance with my invention;

Figure 2 is a side elevation of the forward end of the tool;

Figure 3 is a plan view of the forward end of the tool;

Figure 4 is a perspective of the rear end of the tool; and

Figure 5 is a section on the line 5—5 of Figure 1.

Referring now more particularly to the drawings, R designates the rear construction of an automobile including the usual transverse member T upon which the wheels W are mounted and which forms the rear axle of the vehicle and a longitudinally extending member L within which the drive shaft is mounted and which is provided upon its forward end with a universal joint housing 15. Within this universal joint housing is disposed a universal joint, the forward end of which is designated at 16 and which engages in a socket provided therefor in the rear end of the transmission of the engine E, the transmission cover of which is generally indicated at 17. To a flange 17ª formed on the rear end of this transmission housing a flange 15ª formed upon the universal joint housing is secured, a gasket 15ᵇ being disposed between the flanges 17ª and 15ª. This gasket is formed from a single piece of cork and it will, therefore, be obvious that in order to apply such a gasket it is necessary to separate the housing 15 from the housing 17 a sufficient distance to permit the passage of the gasket 15ᵇ about the forward end of the universal joint housing and the forward end of the universal joint 16. Ordinarily this is accomplished by disconnecting the rear construction R and withdrawing the same. This operation in addition to consuming a considerable space of time necessitates blocking the body of the vehicle to support the same and renders the vehicle immovable, which is often undesirable. This operation must be performed each time that it is desired to remove the engine E for any repairs thereto or when it is desired to replace the gasket 15ᵇ or perform any one of a series of operations on the transmission of the vehicle.

In accordance with my invention I provide a tubular bar 13 to the rear end of which are secured a pair of diverging arms 6 which are welded to the tubular bar 13, as at 18. The rear ends of these diverging arms are provided with upstanding angular portions 6ª terminating at their upper ends in longitudinally directed hook portions 6ᵇ. The forward end of the tubular bar provides a mounting 14 and a rotatable ratchet and gear assembly 8 and the bore of this end of the tube receives the worm threaded rear end 11 of a bar 12, the forward end of which is adapted, as at 12ª, for engagement between the flanges F of a front axle A. The worm threaded end 11 of the bar 12 has mounted thereon a bevel gear 9 meshed with the gear of the gear and ratchet assembly 8. The mounting 14 further forms a mounting for a bell crank lever 7 one arm 9′ of which is provided with a ratchet 10 for engagement with the teeth of the ratchet section of the ratchet and gear assembly 8, this pawl being swingable to engage with the teeth of the ratchet during oscillatory movement of the arm 9' in either direction as may be selected, so that the ratchet and gear assembly 8 may be rotated to actuate the gear 9 in either direction and therefore to extend or shorten the effective exposed length of the bar 12.

In the use of the device the hooked ends 6ᵇ of the arm 6 are engaged over the transverse member T of the rear construction at opposite sides of the differential housing D thereof, the vertical members 6ᵃ of these arms abutting the transverse member, the forward end of the bar 12 is then engaged against the axle A between the flanges F therefor. Attention is directed to the fact that the drop afforded by the vertical portions 6ᵃ of the arms 6 permits the device to be arranged directly beneath the longitudinal member L of the rear construction and, accordingly, a direct pull will be exerted upon proper operation of the ratchet mechanism which places no side strain whatever upon the parts of the mechanism. Furthermore, the tube 13 passing directly below the longitudinal member L permits the application of a support S for this longitudinal member if the same be desired, it being obvious that the longitudinal member will move downwardly by gravity upon its engagement from the transmission housing 17.

It will be seen from the foregoing that by the use of a device constructed in accordance with my invention, the operation of separating the sections of the universal joint housing is greatly simplified and may be accomplished by a single person, whereas by the methods employed heretofore it has been necessary to employ two or three mechanics to assist in the removal of the rear construction. It will furthermore be obvious that the construction of the device as hereinbefore set forth is subject to some change and modification without materially departing from the spirit of my invention and I accordingly do not limit myself to such specific structure except as hereinafter claimed.

I claim:—

1. In a tool for withdrawing the rear construction of a motor vehicle to disengage the forward end thereof from associated mechanism, a tubular bar provided at its rear end with spaced vertical portions having hooks at their ends adapted to be engaged with the transverse member of the rear construction at opposite sides of the differential housing thereof, a second bar having its rear end slidably mounted in the opposite end of the first named bar and means rotatable upon the first named bar and operatively connected with the second named bar for withdrawing the rear end of the second named bar from the first named bar.

2. A tool for withdrawing the rear construction of a motor vehicle to disengage the forward end thereof from associated mechanism, comprising a longitudinal extensible bar adapted at its forward end for engagement with a rigid part of the vehicle and provided at its rear end with spaced vertically extending portions having at their upper ends rearwardly directed hooks for engagement over the transverse member of the rear construction at opposite sides of the differential housing thereof.

In testimony whereof I hereunto affix my signature.

ALFRED B. SEPPMANN.